US009894973B2

(12) United States Patent
Arellanes et al.

(10) Patent No.: US 9,894,973 B2
(45) Date of Patent: Feb. 20, 2018

(54) REUSABLE PORTABLE CARGO CARRYING CONTAINER

(71) Applicants: Guadalupe Arellanes, Tijeras, NM (US); James Edward Arellanes, Tijeras, NM (US)

(72) Inventors: Guadalupe Arellanes, Tijeras, NM (US); James Edward Arellanes, Tijeras, NM (US)

(73) Assignee: Guadalupe Arellanes, Tijeras, NM (US)

( * ) Notice: Subject to any disclaimer, the term of this patent is extended or adjusted under 35 U.S.C. 154(b) by 104 days.

(21) Appl. No.: 14/998,033

(22) Filed: Oct. 30, 2014

(65) Prior Publication Data

US 2017/0129409 A1    May 11, 2017

Related U.S. Application Data

(60) Provisional application No. 61/929,703, filed on Jan. 21, 2014.

(51) Int. Cl.
| | |
|---|---|
| *A45C 3/04* | (2006.01) |
| *A45C 13/36* | (2006.01) |
| *A45C 7/00* | (2006.01) |
| *A45C 13/00* | (2006.01) |

(52) U.S. Cl.
CPC ............ *A45C 13/36* (2013.01); *A45C 7/0077* (2013.01); *A45C 13/00* (2013.01); *Y02W 30/807* (2015.05)

(58) Field of Classification Search
CPC ............ A45C 13/36; A45C 3/04; A45C 3/001
USPC .................................. 224/400, 411, 412, 413
See application file for complete search history.

(56) References Cited

U.S. PATENT DOCUMENTS

| | | | |
|---|---|---|---|
| 5,046,860 A * | 9/1991 | Brennan ................. | A45C 13/02 150/111 |
| 8,459,489 B2 * | 6/2013 | Potts .................... | A45C 7/0022 220/212 |

* cited by examiner

*Primary Examiner* — King M Chu
(74) *Attorney, Agent, or Firm* — Alberto A. Leon, Esq.; Aleónlaw, P.C.

(57) ABSTRACT

The cargo carrier of the present invention is a cargo container that comprises at least one immobilizing flap that allows it to be secured inside a vehicle without shifting position as the vehicle moves. The immobilizing flap is securely affixed to one side of the container, and is protrudes through the base of the tailgate, trunk or door of the vehicle, stabilizing the cargo carrier in the cargo area of the vehicle. Another embodiment of the immobilizing flap is a loop of fabric through which the vehicle's seat belt can be extended, stabilizing the cargo carrier in a vehicle's seat. The cargo carrier take any number of forms found in the prior art to include collapsible coolers, golf bags, reusable grocery totes, food catering bags, and other carrying devices.

2 Claims, 5 Drawing Sheets

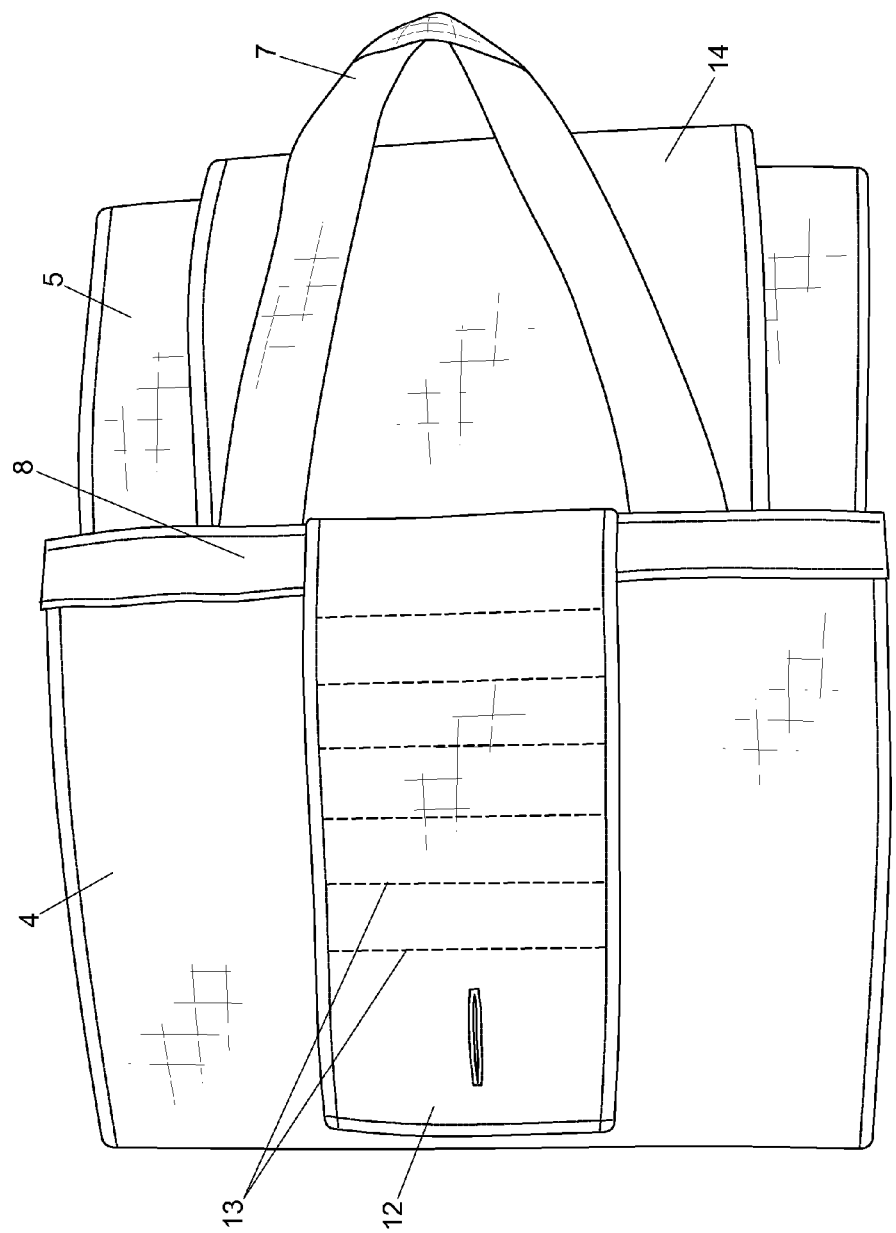

REUSABLE PORTABLE CARGO CARRYING CONTAINER

CROSS-REFERENCE TO RELATED APPLICATIONS

Figure 1:
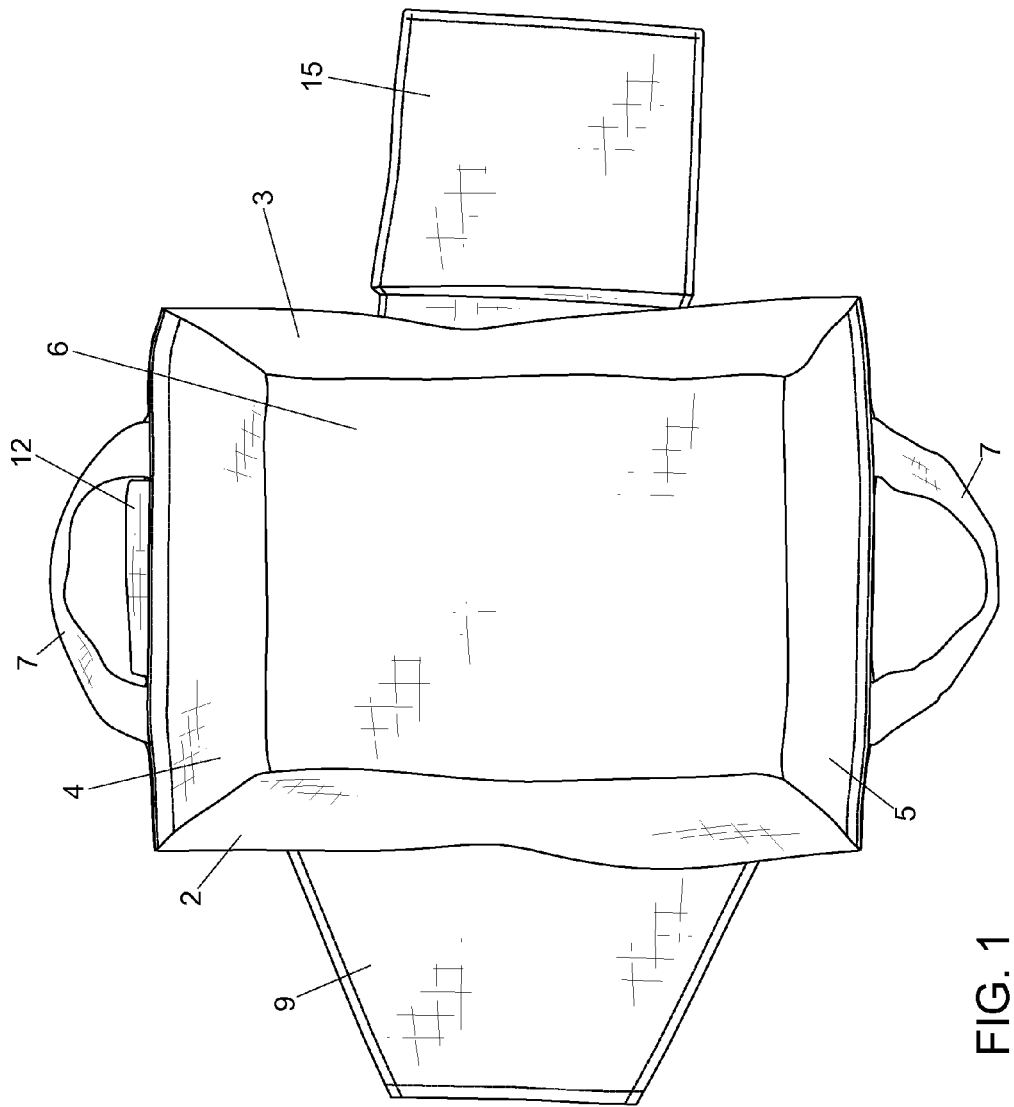

Provisional Application No. 61/929,703 filed Jan. 21, 2014

STATEMENT REGARDING FEDERALLY SPONSORED RESEARCH AND DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION

Field of the Invention

The present invention relates generally to cargo carrying containers and more specifically to cargo carrying containers capable of being used for multiple purposes including, but not limited to, luggage, tote bags, golf bag carriers and reusable grocery bags, comprising attaching, strapping and immobilizing means capable of keeping the container and its cargo from shifting during transport in a vehicle.

Description of the Related Art Including Information Disclosed Under 37 CFR 1.97 and 37 CFR 1.98

The following description of the art related to the present invention refers to a number of publications and references. Discussion of such publications herein is given to provide a more complete background of the principles related to the present invention and is not to be construed as an admission that such publications are necessarily prior art for patentability determination purposes.

Most carry-out bags, tote bags and boxes used in the food delivery, grocery and many other retail industries are not particularly practical to transport groceries, food or multiple pieces of merchandise from one place to another in a car, sports utility vehicle ("SUV") or pick up truck. When attempting to do so, one often finds the contents of the carry out bags, tote bags or boxes strewn over the surface of the vehicle with some articles spilled or damaged. That is usually the result of items sliding around when the vehicle starts, stops or turns. Specifically, in the case of pick up trucks, the bed of the pick-up truck is typically slanted towards the cab of the truck when there is a small or light load making objects even more prone to shifting forward during stops. Large items can be tied or strapped down to keep them from shifting, but small items can be difficult to secure. Also, many pick-up trucks do not have any adequate features that come standard with the vehicle to secure the cargo.

Similar situations occur when one tries to transport articles in a car's seat or trunk using the most commonly available carry-out bags, tote bags or boxes. The most common containers, on the one hand, and most vehicles, on the other hand, do not have restraining or securing means. The invention embodied in the present application solves many of those problems.

Another significant problem with the present state of the art is that carry-out bags generally do not biodegrade and instead persist in the environment for hundreds of years. The material used to manufacture most of those carry-out bags breaks down very slowly, mostly through abrasion, tearing and photo degradation. That break-down and in some cases decomposition, result into toxic plastic bits or metabolites that contaminate soil and water while entering the food web when animals inadvertently ingest or spread those materials.

The litter problem resulting from single use plastic bags is becoming increasingly difficult to manage for local governments, and has costly negative implications for tourism, wildlife and aesthetics. Even though single use paper grocery bags are made from renewable resources and are less of a litter problem than single use plastic carry out bags, they require more resources to manufacture, transport and recycle or dispose of than single use plastic carry out bags. For those reasons, several jurisdictions across the country have implemented regulations limiting the use of single-use bags and encouraging establishments to provide reusable bags.

The main objective of the invention embodied in the present application is to provide a reusable, portable and durable cargo carrying container capable of being secured or engaged to different parts of a vehicle to safely transport cargo from any location to another. An ideal portable cargo carrier would have to be reusable, lightweight and capable of being easily folded and stored while not in use.

BRIEF SUMMARY OF THE INVENTION

Objects, advantages and novel features, and further scope of applicability of the present invention will be set forth in part in the detailed description to follow, taken in conjunction with the accompanying drawings. The objects, advantages and novel features, and further scope of applicability of the present invention will become apparent to those skilled in the art upon examination of the following, or may be learned by practice of the invention. The objects and advantages of the invention may be realized and attained by means of the instrumentalities and combinations particularly pointed out in the appended claims.

The present application discloses and claims one or more immobilizing flaps that are an integral part of a portable cargo carrying container (luggage/tote bag/golf bag carrier/reusable grocery bag and all various configurations of cargo carriers hence forth referred to as portable cargo carriers). The invention is a removable cargo carrier that is temporarily secured to a vehicle using the pressure of the vehicle's hatchback door, trunk door or truck tailgate to secure an immobilizing flap. An immobilizing flap keeps the bag and its cargo from shifting during transport in a vehicle by restraining the items when the vehicle stops, accelerates, or turns. The portable cargo carrier is ideal for the cargo area of an SUV or hatchback, vehicle trunk or truck bed. The bag is secured by placing the immobilizing flap in the door jamb of the vehicle's hatchback door or trunk, or the space between the end of its truck bed and open tailgate. The door, trunk or tailgate is the closed on the immobilizing flap, which secures the carrier due to the pressure of the door placed on it. The carrier has handles and can be taken into stores, loaded with purchases, then secured into a vehicle so the contents won't spill during transport. The preferred embodiment of the invention is collapsible into a flattened form that allows for simple storage when not in use.

The object of the invention embodied in the present application is to provide a reusable, durable and portable cargo carrying container that can be used numerous times thus alleviating the environmental impact of disposing of non-reusable carry out bags or boxes.

Another object of the present invention is to provide a portable cargo carrier comprising one or more immobilizing flaps that will securely hold cargo in the back of a pick-up truck, vehicle or SUV, and keep it from shifting during vehicle operations. Another object of the present invention is to provide a portable cargo carrier comprising one or more immobilizing flaps that will securely hold cargo in the seat of a vehicle using the vehicle's seatbelt, and keep it from shifting during vehicle operations.

Another object of the present invention is to provide a portable cargo carrier comprising an immobilizing flap that is easy and inexpensive to manufacture, and is simple to operate.

Another object of the present invention is to provide a portable cargo carrier comprising an immobilizing flap that can be easily folded flat and stowed away when not in use.

Another object of the present invention is to provide a portable cargo carrier comprising an immobilizing flap that is fashionable or appealing to the eye.

Another object of the present invention is to provide a portable cargo carrier system comprising an immobilizing flap that is very versatile and can be used on a wide range of cargo types and vehicle types without the use of hooks, Velcro®, or any bulky bars or braces.

Another object of the present invention is to provide a portable cargo carrier system comprising an immobilizing flap that can be installed without tools or fastening hardware, and without modification of the vehicle or truck bed (e.g. drilling holes).

BRIEF DESCRIPTION OF THE SEVERAL VIEW OF THE DRAWINGS

The accompanying drawings, which are incorporated into and form a part of the specification, illustrate an embodiment of the present invention and, together with the description, serve to explain the principles of the invention. The drawings are only for the purpose of illustrating a preferred embodiment of the invention and are not to be construed as limiting the invention.

FIG. 1: is a top view of the preferred embodiment of the invention with all flaps extended.

Figure 2:
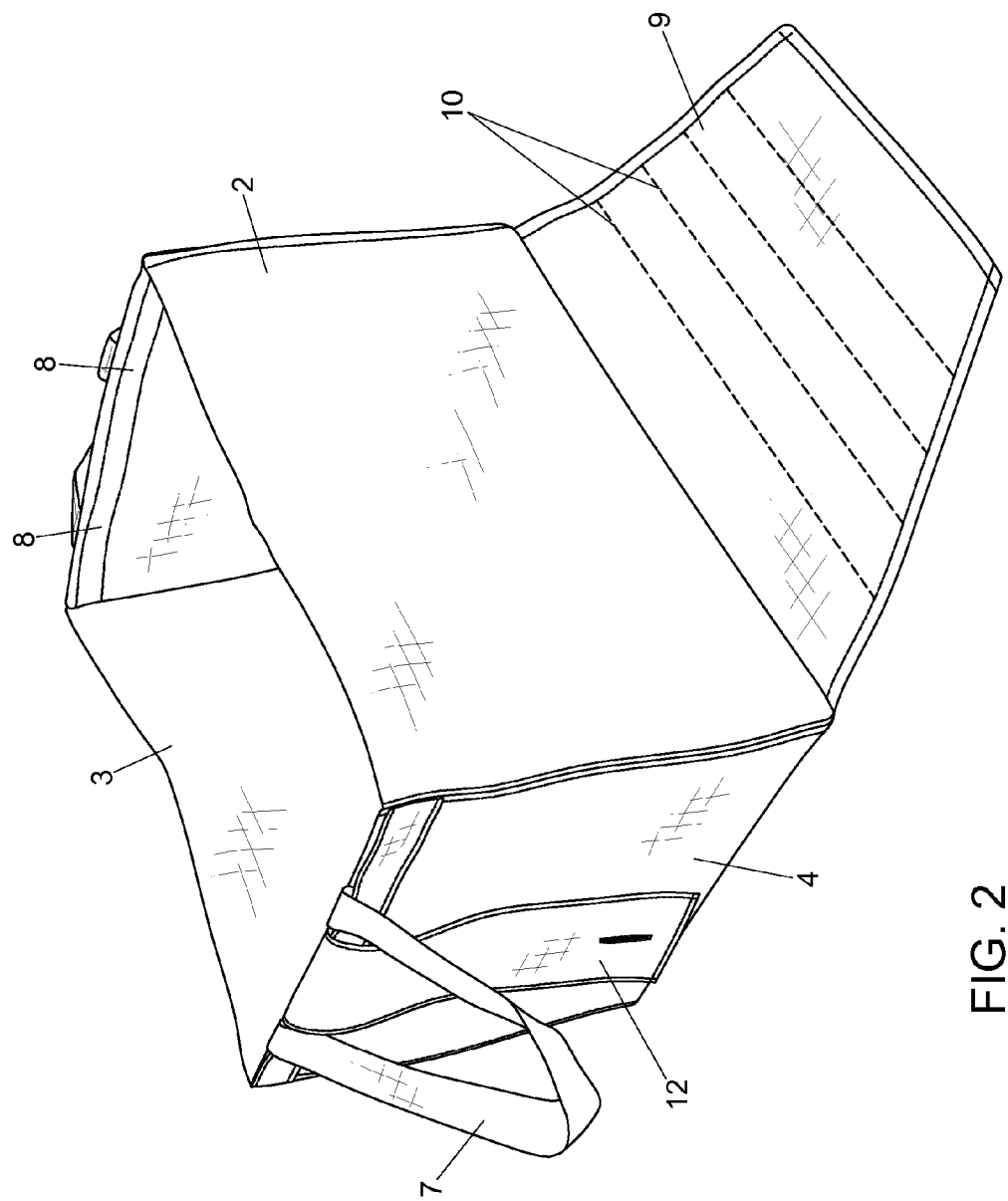

FIG. 2: is a front perspective view of the preferred embodiment of the invention.

Figure 3:
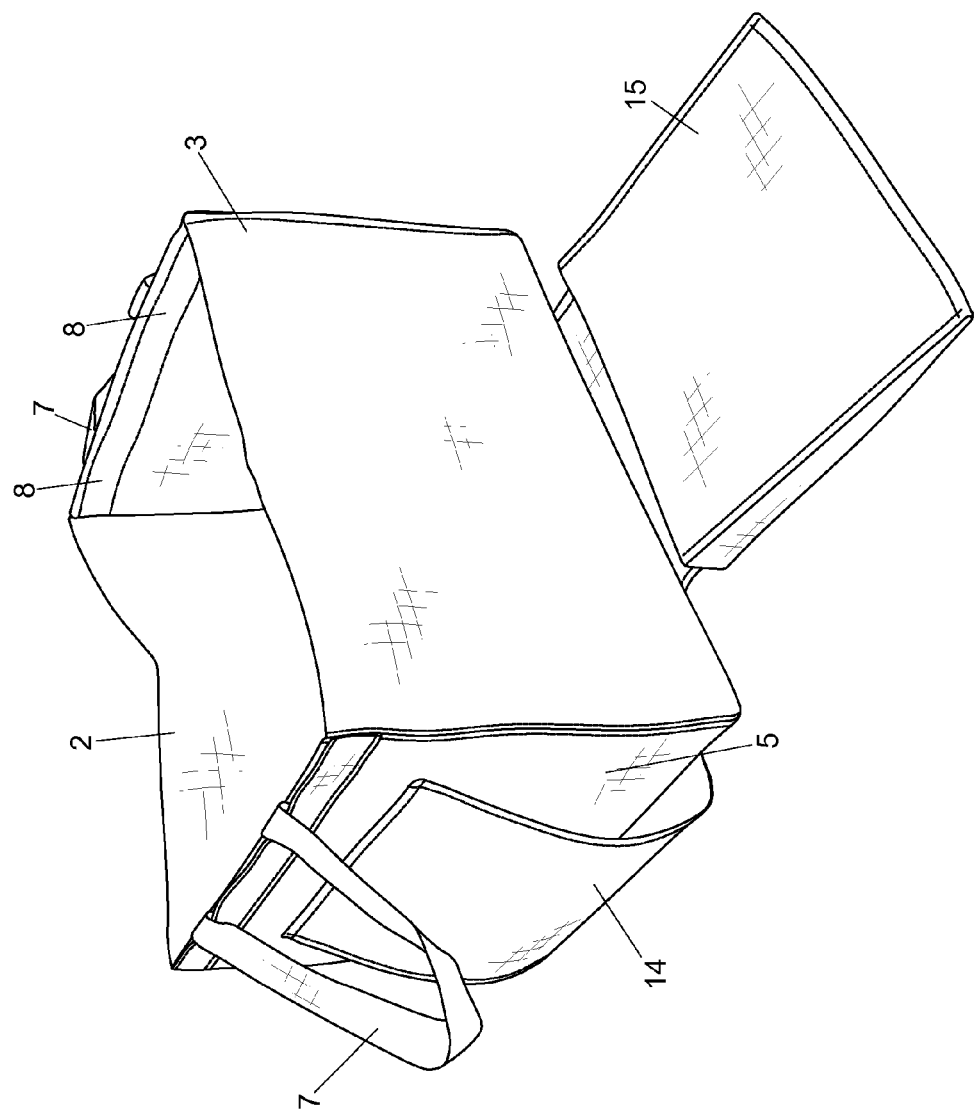

FIG. 3: is a rear perspective view of the preferred embodiment of the invention.

Figure 4:
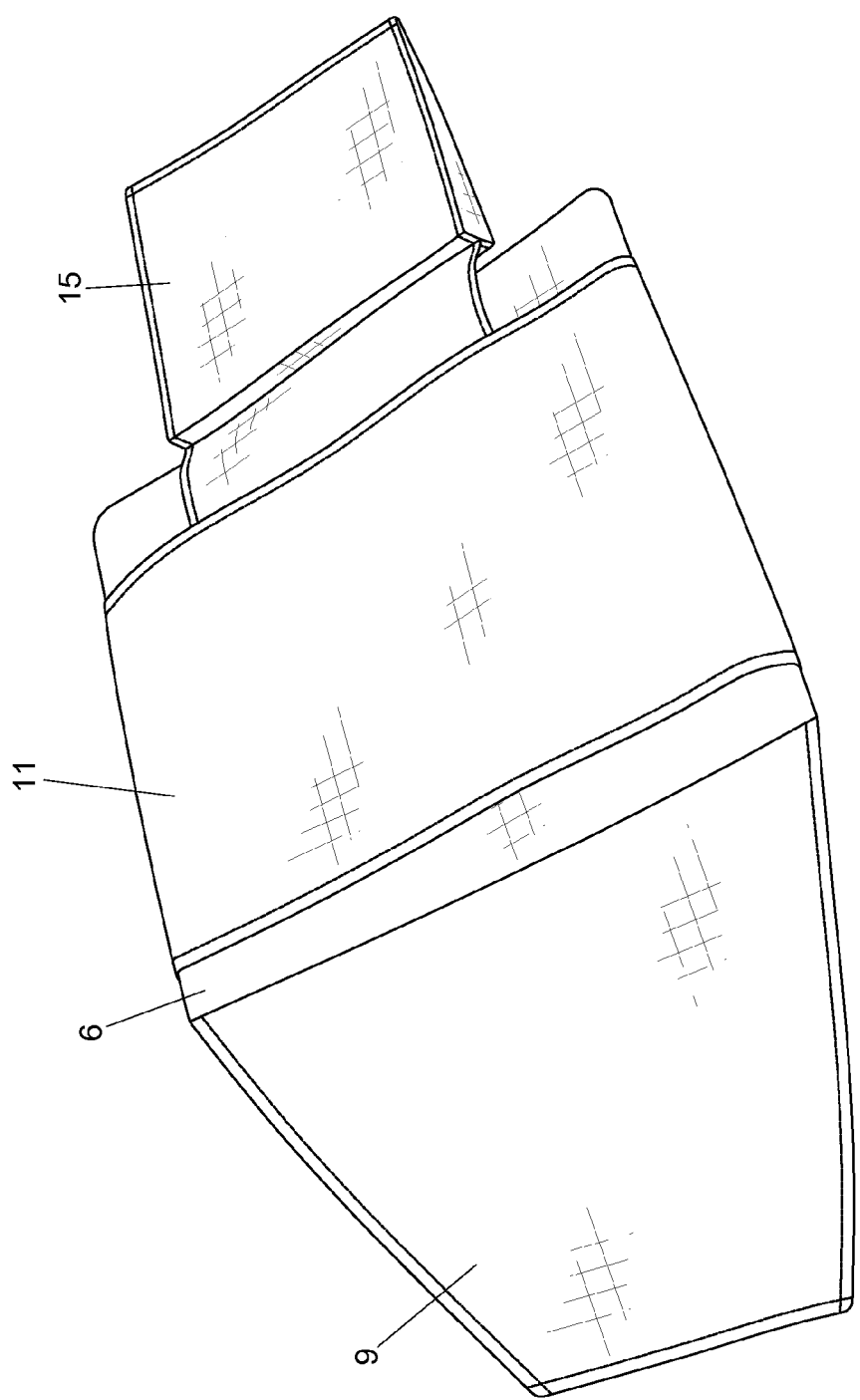

FIG. 4: is a bottom perspective view of the preferred embodiment of the invention.

FIG. 5: is a top view of the folded of the preferred embodiment of the invention.

DETAILED DESCRIPTION OF THE INVENTION

The cargo carrier of the present invention is a cargo container that comprises at least one immobilizing flap that allows it to be secured inside a vehicle without shifting position as the vehicle moves. The cargo container take any number of forms found in the prior art to include collapsible coolers, golf bags, reusable grocery totes, food catering bags, and other carrying devices made of sturdy fabric, leather or synthetic materials.

The preferred embodiment of the invention, as depicted in FIGS. 1 through 5, comprises three types of immobilizing flaps and a leveling element. The immobilizing flaps are preferably manufactured from the same material as the rest of the cargo carrier and are sewn into the container and reinforced with additional fabric to distribute the load across the entire length of the container edge and minimize stress concentration in any area. The preferred embodiment of the invention is a collapsible square or rectangular box with an open top. The body (1) of the carrier is constructed from a thick flexible fibrous material, fabric and thread. The rectangular shape of the preferred embodiment has a large base which creates stability and control. It also has a lower center of gravity versus most prior art cargo carriers to mitigate the likelihood of tipping.

The front (2) and back (3) sides of the carrier are the long sides of the rectangle. The left (4) side and right (5) side are the short sides of the rectangle. The four sides terminate in the flat bottom (6) of the carrier. In the preferred embodiment, the right side (5), left side (4) and bottom (6) of the carrier are ideally made of sturdy foam board covered in fabric. The bottom (6) is made of rigid material that will not buckle under the weight of the container's contents, which is also covered in fabric.

The carrier also comprises carrying handles (7) attached to the top of the left and right sides of the carrier. The handles (7) are attached to a strong fabric strapping sewed along the length of right (5) and left (4) sides. The handles (7) are also sewed into the embedded fabric interface to distribute the load and mitigate any stress concentrations at the attachment points (8). The handles (7) are primarily intended for moving a loaded carrier from a shopping basket into the cargo area of a vehicle. The front side (2) and back side (3) of the carrier comprise a strong but flexible interface covered in fabric. The flexible interface material allows the front and back sides to flex so that the carrier can collapse to a flattened position for storage, as illustrated in FIG. 5.

The first immobilizing flap (9), which is illustrated in FIG. 2, is designed to be used in a pickup truck or a car or SUV with a hatchback door in the rear of the vehicle. The first immobilizing flap (9) is sewn into the bottom (6) of the carrier and protrudes out from the bottom edge of the front side (2) of the carrier. In the preferred embodiment, the first immobilizing flap (9) is constructed from an interface material that is sufficiently thin not to interfere with the closing of the tailgate or hatchback door of the vehicle. Multiple stabilizing strips (10) of a sturdy, durable material such as foam board are permanently affixed to the interface material parallel to the front side (2) of the carrier. The multiple thin horizontal strips naturally find their place in the contours of the vehicle tailgate or door jamb furthering resistance. The interface material and the stabilizing strips (10) are covered in fabric. In order to install the carrier, the user positions the first immobilizing flap (9) in such a way that the hatchback door or tailgate of the vehicle will close on the first immobilizing flap (9) between the stabilizing strips (10). This arrangement prevents the flap and the carrier from sliding out of position during transport in the vehicle. The integration of the immobilizing flap (9) into the bottom (6) of the carrier results in the weight of cargo placed inside the carrier adding resistance to the immobiling flap, further preventing shifting of cargo inside the carrier. When not in use, the first immobilizing flap (9) can be tucked into the storage flap (11) underneath the bottom (6) of the carrier. The storage flap (11) is a piece of material that extends along the length of the carrier and is attached to the outside portion of the bottom (6) of the carrier by being sewn or otherwise affixed adjacent to the bottom edge of the right side (5) and left side (6) of the carrier.

The second immobilizing flap (12), which is depicted in FIG. 2, is designed to be used with a vehicle that has a trunk. In the preferred embodiment, the second immobilizing flap (12) protrudes from the top of the left side (4) of the carrier. The left side (4) of the carrier also comprises a carrying handle (7). In the preferred embodiment, the second immobilizing flap (12) fits between the attachment points (8) of the carrying handle (7). In the preferred embodiment, the second immobilizing flap (12) is constructed from an interface material that is sufficiently thin not to interfere with the closing of the trunk or door of the vehicle. Multiple stabilizing strips (13) of a sturdy, durable material such as foam board are permanently affixed to the interface material parallel to the left side (4) of the carrier. The multiple thin horizontal strips naturally find their place in the contours of the vehicle's trunk door or door jamb furthering resistance. The interface material and the stabilizing strips (13) are covered in fabric. In order to install the carrier, the user places the carrier in the trunk of a vehicle with the left side (4) adjacent to the opening of the trunk and positions the second immobilizing flap (12) in such a way that the trunk will close on the immobilizing flap (12) between the stabilizing strips (13). Alternately, the carrier can be placed on the floor of a vehicle with the left side (4) adjacent to a door. The second immobilizing flap (12) can be placed in the door jamb in such a way that the door will close on the immobilizing flap (12) between the stabilizing strips (13). When not in use, the second immobilizing flap (12) lies flat against the inside or outside portion of the left side (4) of the carrier.

The third immobilizing flap (14) functions differently than the first two in that it is designed to secure the carrier in to a vehicle's seat using the vehicle's seat belt. The flap (14) comprises a broad section of material that protrudes from the right side (5) of the carrier that is attached near the top and the bottom of the right side (5). The material that comprises the flap is longer than the distance that it spans along the right side of the carrier, resulting in excess material protruding outward from the carrier, as illustrated in FIG. 3. The vehicle's seat belt is threaded through the third immobilizing flap (14) and is fastened. The seat belt holds the carrier in place during transport.

The preferred embodiment comprises a leveling element (15) that works in conjunction with the third immobilizing flap (14). The leveling element (15) is preferably a dense foam wedge that is affixed to interface material and covered in fabric. The leveling element (15) is sewn into the bottom (6) of the carrier and protrudes out from the bottom edge of the back side (3) of the carrier. In the preferred embodiment, the foam wedge is angled at a 20% angle. The angle of the wedge offsets the slope in a standard seat of a car, resulting in the bottom (6) of the carrier being fairly level when the carrier is placed in the seat of a car. In the preferred embodiment, the leveling element (15) can be tucked into the storage flap (11) underneath the bottom (6) of the carrier.

Various embodiments of the carrier are easily envisioned using different combinations of the immobilizing flaps on different sides of the carrier. An embodiment designed for pickup trucks and hatchbacked vehicles might only have the first immobilizing flap (9), with or without the storage flap (11) attached to the bottom of the carrier. An embodiment for sedans might have the second immobilizing flap (12), the third immobilizing flap (14) or both. The third immobilizing flap (14) can be present with or without the leveling element (15). The leveling element (15) can be present with or without the storage flap (11). These combinations of immobilizing flaps can be added to a broad array of prior art cargo carrying devices in order to ensure their stability during vehicle transport. Further, the immobilizing flaps can be attached to any portion of a cargo carrying device in order to ensure immobilization of the carrier during transportation.

What is claimed is:

1. A reusable, portable cargo carrying container comprising:
    a. four sides and a base attached to each other in an open box configuration such that each side is of equal length and height to its opposite counterpart, each side comprising a top and a bottom, an exterior surface and an interior surface;
    b. two handles securely attached to the tops of opposite sides; and
    c. one or more immobilizing flaps attached to the top or bottom of any of the four sides, the immobilizing flap comprising an interface material, multiple strips of a sturdy, durable material affixed to the interface material the strips being placed in a parallel configuration with respect to the side of the carrying device from which the flap protrudes, and a material covering containing the interface material and strips.

2. The reusable, portable cargo carrying container of claim 1, wherein the base of the carrying container additionally comprises a levelling element, the levelling element comprising a dense foam wedge that is affixed to the interface material and covered in fabric, the levelling element protruding from the base along the bottom of a side adjacent to a side comprising the flaps of the carrying device.

* * * * *